(12) United States Patent
Backhaus et al.

(10) Patent No.: US 7,449,047 B2
(45) Date of Patent: Nov. 11, 2008

(54) METHOD AND DEVICE FOR SEPARATING A GAS FLOW USING A MEMBRANE FOR ENRICHING AT LEAST ONE GAS COMPONENT IN THE GAS FLOW

(76) Inventors: Clemens Backhaus, Schulstrasse 11, Alpen (DE) 46529; Hubert Werneke, Moehneweg 47a, Dortmund (DE) 44287

( * ) Notice: Subject to any disclaimer, the term of this patent is extended or adjusted under 35 U.S.C. 154(b) by 446 days.

(21) Appl. No.: 10/519,555

(22) PCT Filed: Jun. 2, 2003

(86) PCT No.: PCT/EP03/05739

§ 371 (c)(1),
(2), (4) Date: Jun. 29, 2005

(87) PCT Pub. No.: WO2004/002884

PCT Pub. Date: Jan. 8, 2004

(65) Prior Publication Data

US 2005/0229778 A1 Oct. 20, 2005

(30) Foreign Application Priority Data

Jun. 28, 2002 (DE) ................................ 102 29 232

(51) Int. Cl.
*B01D 53/22* (2006.01)
(52) U.S. Cl. ............................ 95/54; 95/45; 96/4; 96/7; 96/8; 96/9; 96/10; 96/11; 55/315
(58) Field of Classification Search ....................... 96/4, 96/7, 8, 9, 10, 11; 95/45, 54; 55/315, 385.1, 55/DIG. 17
See application file for complete search history.

(56) References Cited

U.S. PATENT DOCUMENTS 3,976,451 A * 8/1976 Blackmer et al. .............. 95/54

(Continued)

FOREIGN PATENT DOCUMENTS

DE        100 02 692 A1    8/2001

(Continued)

OTHER PUBLICATIONS

Chemical Abstracts+ Indexes, American Chemical Society, Columbus, US; Chemical Abstracts+ Indexes, American Chemical Society; Columbus, US, XP000192761; ISSN: 0009-2258; Abstract ; 1991.

(Continued)

*Primary Examiner*—Jason M Greene
(74) *Attorney, Agent, or Firm*—David S. Safran

(57) ABSTRACT

A membrane separation process for the enrichment of at least one gas component in a gas flow, especially for the oxygen enrichment of the air and/or for the enrichment of carbon dioxide using a membrane separation device (10), which is a part of a membrane separation unit (2) and includes at least one membrane. The gas is separated into a retentate (8), which is discharged on the retentate side (12) of the membrane, and a permeate (9), which is discharged on the permeate side (11) of the membrane. To allow the separation of gases or the enrichment of a gas component in a gas flow at a low energy consumption rate and at low investment and production costs, the pressure of the gas stream is lowered before entering the membrane separation unit (2) so that pressure on the permeate side (11) is lower as compared with the inlet pressure.

24 Claims, 2 Drawing Sheets

U.S. PATENT DOCUMENTS

Figure 1:
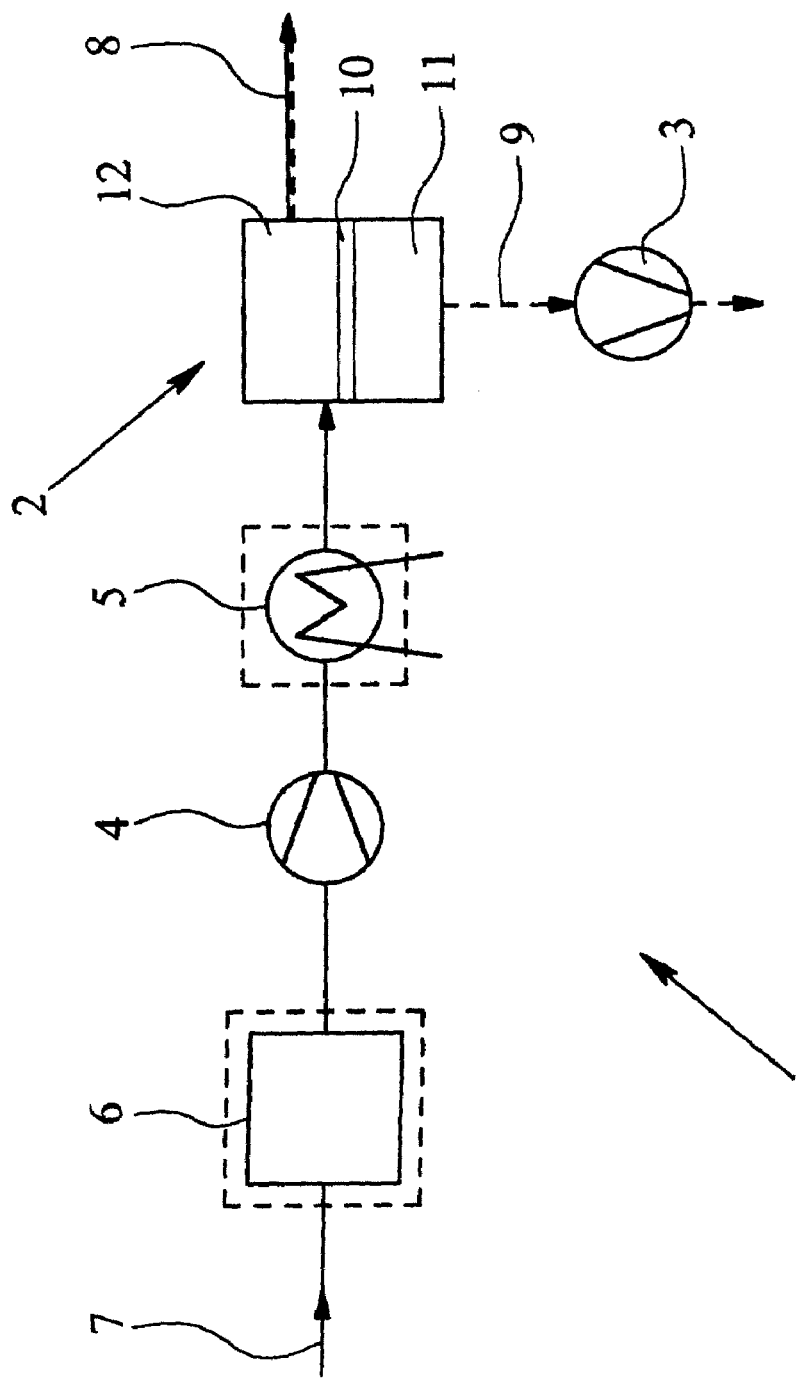

| | | | |
|---|---|---|---|
| 5,314,528 A | 5/1994 | Monereau | |
| 5,447,555 A * | 9/1995 | Ye et al. | 95/54 |
| 5,500,036 A | 3/1996 | Kalthod | |
| 5,837,032 A | 11/1998 | Moll et al. | |
| 5,893,275 A * | 4/1999 | Henry | 62/615 |
| 6,478,852 B1 * | 11/2002 | Callaghan et al. | 95/54 |
| 6,485,545 B1 | 11/2002 | Ohlrogge et al. | |
| 6,540,813 B2 * | 4/2003 | Nelson et al. | 95/54 |

FOREIGN PATENT DOCUMENTS

| | | |
|---|---|---|
| EP | 0 362 436 A1 * | 4/1990 |
| EP | 0 821 993 A2 | 2/1998 |
| WO | WO 99/38602 A1 | 8/1999 |

OTHER PUBLICATIONS

Chemical Abstracts+ Indexes, American Chemical Society; Columbus, US; Chemcial Abstracts+ Indexes, American Chemical Society; Columbus, US; XP 000284706; ISSN: 0009-2258; Abstract ; 1992.

Patent Abstracts of Japan, col. 016, No. 029 (C-0904); Jan. 24, 1992 & JP 03 242304 A (Daikin Ind Ltd), Oct. 29, 1991 Abstract.

* cited by examiner

METHOD AND DEVICE FOR SEPARATING A GAS FLOW USING A MEMBRANE FOR ENRICHING AT LEAST ONE GAS COMPONENT IN THE GAS FLOW

BACKGROUND OF THE INVENTION

1. Field of the Invention

The invention concerns a membrane separation process for the enrichment of at least one gas component in a gas flow, particularly for the oxygen enrichment of the air and/or for the enrichment of carbon dioxide in a gas flow. The gas flow for enrichment of the gas is led to a membrane separation unit including at least one membrane. This is where the separation of the gas flow into a retentate, which is discharged on the retentate side of the membrane, and a permeate, which is discharged on the permeate side of the membrane, takes place. Secondly, this invention relates to a membrane-separation plant for the enrichment of at least one gas component in a gas flow, particularly for the oxygen enrichment of air. It provides at least one membrane separation device including at least one membrane, with the gas flow supposed to the enrichment of the gas being led to a membrane separation unit. The separation of the gas flow into a retentate, which is discharged on the retentate side of the membrane, and a permeate, which is discharged on the permeate side of the membrane, takes place on the membrane.

2. Description of Related Art

Today oxygen and nitrogen are mainly generated by means of the cryogenic separation developed by Linde and Claude 100 years ago (Air Liquide), which presupposes that air is cooled down to −180° C. and then is distilled and/or rectified. Because of the extreme low temperatures, energy consumption costs are inevitably high. The separation device industry concerned with the separation of technical gas are extremely expensive because of their complex form and arrangement. They are used for the production of pure gases in large volumes.

Further possibilities to produce oxygen-enriched air are the methods of adsorptive decomposition into nitrogen and oxygen using the molecular sieve, zeolites and activated charcoal. Separation takes place according to the size of molecules, as well as to the adsorptive and diffuse interactions. The disadvantages of the aforesaid method are high energy consumption and expensive equipment. The plants are usually built for the industry with the purpose to provide with high productivity, primarily for the pure gases. Because of the complexity of the components the costs for investment, capital and maintenance are very high.

In comparison to the existing gas separation methods, the gas separation by membrane is remarkable for its low technical expense. Speaking about the membranous gas separation, it is relevant to distinguish "fluid" or "gaseous" according to the aggregative state, and, according to the mediums or components to separate gas-membrane contactor, membranous pervaporation and gas permeation. The methods using the gas-membrane contactors are characterized by the fluid phase on the permeate side of the membrane, where the permeate is absorbed and the chemical reaction takes place. The gas pervaporation is a method for the separation of organic water solutions or of organic fluids, allowing the permeated components to go from the liquid state into the vaporized state. The distinguishing feature of the gas permeation is that both the feed stream, respectively the retentate stream as well as the permeate stream, are in gaseous state.

The advantage of the gas separation by means of membranes is the low-energy generation of gas of the desired quality. The costs for providing the device as well as for maintenance and service are considerably lower compared to the classical separation methods. Furthermore, the control and regulation expenses for the present membrane separation process are low. The facilities are often modularly built and enable the precise adjustment and regulation of the necessary volume streams. Another advantage is the efficiency of the equipment and the specific lifespan of the single components. One disadvantage of the existing methods for membrane separation is that the gas must be led to the membrane separation unit under high pressure to allow the permeation of the component to be separated, respectively enriched, to pass into the permeate stream. The compression of the input gas flow before entering the membrane separation unit involves considerable energy consumption and is therefore very expensive.

SUMMARY OF THE INVENTION

A primary object of the present invention is to create a membrane separation process and a separation plant as mentioned above, which would allow the gas separation and/or enrichment of a gas component in the gas flow in a manner involving low energy consumption and low capital and production costs.

Before entering the membrane separation unit, the gas flow is compressed up to the inlet pressure, which is higher than the surrounding pressure. At the permeate side, the pressure is lowered as compared with the inlet pressure. The membrane separation process provides an alternative for the solution of the problem mentioned above, which consists firstly in reducing the pressure of the gas flow in the membrane separation unit, secondly to reducing the outlet pressure of the retentate stream to below the pressure found in the surrounding. Thirdly, the pressure of the retentate stream on the permeate side is reduced as compared to the pressure of the original pressure. The object mentioned above is attained by involving at least one vacuuming compressor for lowering the pressure on the permeate side of the membrane, particularly to below 1 bar.

The main idea of the invention is to reduce the pressure on the permeate side of the membrane as compared to the inlet pressure of the gas component. The power needed to pass through the membrane is determined by the difference of pressure between the feed stream and the permeate stream respectively through the difference of pressure between the retentate stream and the downstream. Using the technology of the existing method of membrane separation, the feed stream must be compressed to a high level—usually between 8 and 20 bar, and thus providing a rather high driving force. Our invention avoids these technologies. The driving force needed to allow the gas components to pass through the membrane into the permeate stream is produced not by means of compression of the input gas flow, but by lowering the pressure on the permeate side. Since the energy needed for the compression of a gas flow respectively for lowering the pressure is proportional to the gas volume, it is possible to use this method for reducing the energy consumption for the enrichment of a gas component in a gas flow compared. There is no need to compress the whole feed gas stream, but it is sufficient to lower the pressure of the permeate stream that is usually much lower than the input gas flow. It is the membranous separation method that first enables to discover new application and practice fields and to apply the method of membranous separation efficiently in certain fields.

There are two alternative forms of the membrane separation method. On the one hand, the gas flow can be compressed above the ambient pressure up to the inlet pressure before it enters the membrane separation unit. In this case, the pressure level on the retentate side of the membrane can be reduced, whereas the gas flow is led up to the membrane separation device under the ambient pressure. On the other hand, it is necessary to reduce the pressure on the permeate side of the membrane as compared to the outlet pressure of the retentate stream, so that the gas components can pass through the membrane.

The important thing is that the compression of the gas flow before entering the membrane separation unit, respectively the lowering of the pressure of the retentate stream, is exactly at the level needed to compensate the loss of pressure that occurs when the gas flow is passing to the retentate side of the membrane separation unit. The lower that the gas flow is compressed, respectively the smaller the outlet pressure of the retentate stream is lowered below the ambient pressure, the less energy consumption is connected to the membrane separation process. At the same time, the capital and production expenses are reduced.

In addition, it is very important that the pressure level on the permeate side must be strongly reduced to ensure a sufficient driving force for the enrichment of the gas components in the downstream. It is clear according to the invention that, in addition to lowering the pressure on the permeate side, the pressure of the input gas flow can be increased, which includes a rise in driving force.

Even if the invented method is used particularly for oxygen enrichment of the air, it is certainly possible to enrich other gas components in a gas flow. For example, the invention can be used for nitrogen enrichment of the air, involving the oxygen passing through the membrane into the permeate stream, and at the same time, the retentate stream being enriched with nitrogen. Hence, the inventive method can be used both for the separation of carbon dioxide and for the separation and/or enrichment of fuel gas. Finally, it is also possible to employ the present method not only for the enrichment of the gas components in a gas flow, but also for the enrichment of components in any fluid medium.

The enrichment of a gas component in a gas flow is based on the mechanism of gas permeation. The input gas flow or the retentate stream and the permeate stream are in a gaseous state. This process can be described as the solubility-diffusion-mechanism. The sorption of the permeated component of the gas flow, for example, of the oxygen in the air, takes place on the membrane surface in the membrane separation unit. It results in the diffusion through the membrane-separating layer, and finally, in desorption on the permeate side of the membrane.

One main application field of the inventive method is the oxygen enrichment of the air. The enriched air can be used in various areas. The present method provides a means for lowering the energy costs and is, therefore, an efficient method for the oxygen enrichment of the air. Pressure relief at the permeate side of the membrane promotes the improvement of the separating process. The oxygen in the permeate rises as a result of the increase of transmembranous pressure difference. At the same time, the volume of the permeate stream increases. Both of these effects lead to the improvement of separation quality. As a result, the method enables controlling of the volume of the stream of permeate by using a simple and an efficient technology.

On the basis of the gas permeation mechanism, the separation of the input stream (feed stream) into an oxygen-enriched permeate stream and an oxygen-depleted retentate stream takes place. With the help of the method, it is now possible to reach a concentration of oxygen in the permeate stream above 22-45 vol. %, with an oxygen concentration of the permeate stream of about 30 vol. %. It is basically possible that the gas component can be found in the retentate stream. In this case, a majority, respectively many, of the components pass through the membrane into the downstream, while the components that need to be removed for enrichment do not pass through the membrane and are enriched in the retentate stream.

Due to the method, it becomes possible to regulate the volume of the permeate stream and/or the concentration of the components subject to enrichment in the permeate stream by relieving the pressure on the side of the membrane. In this connection, there is a possibility of directing the stream of the permeate and/or the concentration of the components to be removed exactly according to user-related requirements at a low energy consumption level.

An advantageous constructive form of the invention represents a single-stage method. "Single-stage" concerns the increase of pressure of the feed stream or the decrease of pressure of the retentate and/or the foreseen pressure relief of the permeate. The single-stage method is remarkable for its simple structure and allows the process to be carried out distinctly. The single-stage implementation of the method is most productive in technical conditions, when it is necessary to get a partly enriched permeate. It refers, for example, to the oxygen enrichment of the air. The single-stage implementation of the method leads to lower productive and capital expenses and is therefore very efficient.

To keep the energy consumption for the compression of the gas flow on a low level before it enters into the membrane separation unit, it is preferable that the pressure difference between the gas flow and the retentate stream approximately amounts to 1 bar, more preferable 0.2-0.5 bar. In this connection, it is vital that the pressure difference between the retentate and the permeate stream is enough to compensate for the pressure loss occurring on the retentate side when blowing through the membrane separation unit. If the difference is not enough, the concentration of the components of the permeate stream becomes more sparse.

According to another advantageous form of implementation, it is suggest, in accordance with the invention, that the difference of pressure should be adjusted depending on the concentration of the component being subjected to enrichment in the permeate stream. Generally, it is considered, that the pressure level of the feed stream and that of the retentate modulated corresponding to adjusted concentrations in the permeate stream should be as small as possible, in order to minimize the energy consumption.

Further in accordance with the invention, the permeate stream should be discharged under an absolute pressure ranging from 0.2 to 2.0 bar, that of 0.4 to 1.4 bar being preferable. Secondly, the discharge should be under an absolute pressure of between 0.5 and 1 bar and especially less than 1 bar, i.e., under the under-pressure index, is to enable the enriched gas component to pass through the membrane in the permeate stream while concomitant factors for energy consumption are on an low level. Thirdly, the preferable pressure level ranges between the 0.5 and 0.65 bar. The supplied gas flow should have an absolute pressure of 1 to 6 bar, with a pressure of less than 3 bar and especially of between 1.35 and 1.5 bar being of advantage, so that the difference of pressure between the feed and the permeate stream should be set between 0.2 and 0.5 bar. The retentate stream characterized by the absolute pressure levels ranging between 1 and 5.5 bar, with preference of 2.5 and especially of 1 bar, i.e., of its environmental pressure, is easily dischargeable. It should be noted that all the values from the afore-named value circle are regarded as being in accordance with the present invention. However, when applying the invention, one must remember that every value chosen from the value circle may acquire specific advantages.

The invention presupposes that e.g., plate-modules, pocket modules or hollow fiber modules can be used as membrane separation devices. Sure, one can also engage a complex of different separation units, in order to reach the best possible results of separation. The physical properties of the membranes, such as, e.g., separation layer thickness of the membranes, permeability, selectivity and durability under high temperatures, influence the capacity of the membrane separation unit. Depending on the given case of implementation, it is possible to use any membrane type.

Due to the absence of moving components, the membrane separation unit works at the mechanical no-load principle and, therefore, has non-restricted durability. Consequently, the method itself is very thrifty in maintenance. The influence of membrane type deterioration is of a secondary interest in every particular case.

In order to produce different volume streams, it is presupposed to divide the gas flow in at least two partial streams and treat it by a set of parallel working membrane separation devices and/or membrane separation units. It goes without saying that it is also possible to use several modules at the same time, which are incorporated into a membrane separation unit. Yet it is also possible to use a number of membrane separation devices in a cascade connection.

To avoid damage to the membrane separation unit, respectively membrane, and/or pre- or post-compression, respectively, the vacuum compression of gases, it is required to clear off the waste components, such as particle and/or oils and/or fats. The penetration of such wastes in the device components should be avoided, because these wastes may have negative affects on the separation respectively concentration of the gas component. The membrane should be handled with extra care. However, it is important to minimize the expenditures for the gas cleaning, in order to keep the costs at a low level.

It is possible to cool off or to warm the gas flow, preferably after it has been compressed, before it enters the membrane separation unit. The temperatures can be controlled by the given membrane type. By warming up the gas flow, it is possible to prevent the condensation of the gas components, such as, e.g., water steam. The gas flow of 35° C. to 50° C., preferably that of 45° C., is warmed up to 50° C. to 75° C., preferably to 60° C. to 65° C. Cooling off presupposes temperatures between 0° C. to 30° C. and especially 0° C. to 20° C. The warming up or cooling of the gas flow can be undertaken respective of the membrane type, depending on the temperature of specific features, which determine the membranous separation process. If the inventive technique is aimed at the concentration of oxygen in the atmosphere, the air may be supplied directly to the membrane separation unit and the process may take place under ambient temperatures.

It is especially preferred to cultivate high concentrations of oxygen in the air with the help of the described process in order to apply the received permeate substance for gas-motor firing of the landfill gases. After the technical instruction on the recycling of the domestic wastes was introduced, the gas quality rates for the landfill gas have considerably changed. The diffusive extraction of methane from the landfill side is diminished by special precautions of the landfill techniques, gas drainages and complex pipes. The gas quality may differ and can be used in the gas engines of the co-generation power plants only with the methane concentration of no less than 40% of the landfill gas content. There is an alternative for the methane to be fired or evaporated into the atmosphere, the latter being destructive to the environment. The methane is 23 times as harmful as carbon dioxide in causing the greenhouse effect. Not using it means wasting a precious energy source.

The law on the alternative energy sources (EEG) ensures fixed operating revenues for power generation of landfill gas. The systems engineering of the landfill is still existing, but often it cannot be applied because of the low quality of the gas.

The single-stage process of the oxygen enrichment of the air makes it possible to create equipment modules for combustion air with a higher content of oxygen.

The economic basis of the process enables the air to be further used with the gases of lower quality (containing less than 40% of methane) for firing in the block thermal power plants. As a result, large quantities of the inert gases are replaced and one gets the inflammable air-mixtures, which successfully provide the functioning of engines. Other advantages are as follows: the reduction of emissions, better effects and efficiency of the fuel qualities. Besides the economic aspect, the crucial importance lies on the contributing to saving the environment.

The technique described above is able to be applied in the case of wood gases or special gases, such as sewage gas or biogas, without determining any special conditions for them. Otherwise, it is possible to use the technique in micro turbine and fuel cell technologies. Therefore, it is possible to improve the effects by using the technology described above.

Moreover, it is possible to apply the technique described above with corresponding modifications of the process in sporting centers, particularly in the health spas. The air in sport clubs or health spas is known to undergo processes of enrichment or reduction of oxygen content in order to control the sport activity of the people or to promote the progress of sportsmen and to keep them in good health. Oxygen used for this purpose usually comes from special compressed-gas tanks. This can be considered to be highly expensive. The technique described above is therefore advantageous in this case, insofar as it does not require much energy and as it is economic.

Therefore, it is relevant to speak about the possibility of applying the technique to the sphere of climate modifications. One can also use the technique for oxygen enrichment of the sewage in the aerotanks of the purification equipment, where one can correct too little or unstable oxygen content. And at last, it is possible to use the technique in the chemical processes, such as, e.g., in the blast furnaces sphere, what will considerably diminish the costs.

The invention is described in further detail below, without restricting the creativity of thought, with reference to the accompanying drawings.

SUMMARY OF THE INVENTION

Figure 2:
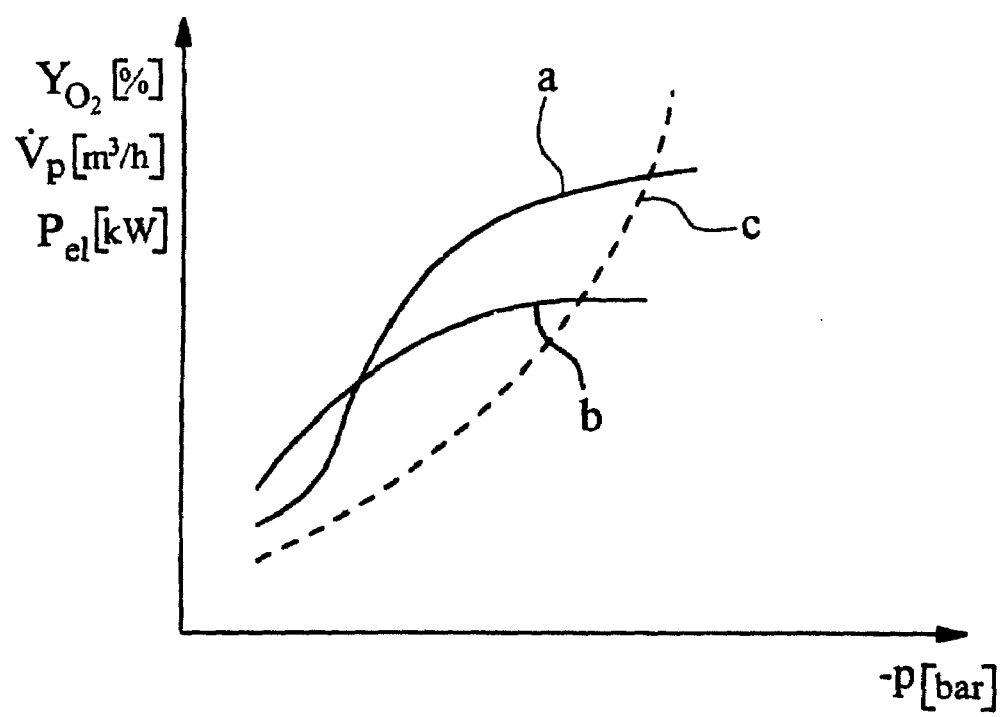

FIG. 1 is a schematic representation of an arrangement for the oxygen enrichment of the air using a membrane separation unit and FIG. 2 is a graph showing the curve of the oxygen concentration in the permeate stream in dependence on the power needed to enrich the permeate stream and on the volume of the stream of permeate.

DETAILED DESCRIPTION OF THE INVENTION

FIG. 1 represents a one-stage method of oxygen enrichment of the air with the help of the membrane separation system 1. According to FIG. 1, the membrane separation system includes a membrane separation unit 2, a vacuum compressor 3, that is switched on before the membrane separation unit 2 and e.g., could be represented by a compressor, a pressure compressor 4, as well as the heat exchanger 5 and filter 6, which are switched on before the membrane separation unit.

The air 7 subject to enrichment is evacuated directly from the atmosphere and supplied to the filter 6, in order to be cleaned of the dust particles or any other rough pollution. Further, the air 7 comes to the pressure compressor 4, where it is compressed up to the absolute pressure level of 1 to 3 bar, particularly to a level of approximately 1.5 bar.

After compression of the air 7, it is supplied to the heat exchanger 5, where it is either warmed up or cooled off. This procedure helps to determine the tolerable temperatures of the membrane separation unit, in particular, the tolerability of the membrane used in the membrane separation device 10. On the other hand, the warming up of the air 7 helps to avoid the condensation of the water steam, supplied to the filter together with the air 7.

The air, passed through the heat exchanger 5, is supplied to the membrane separation unit 2 and is divided into an oxygen-depleted retentate 8 and an oxygen-enriched permeate 9.

The vacuum compressor 3 acts to decrease the pressure level on the permeate side 11 of the membrane separation unit 2. It is preferable to decrease the pressure level on the permeate side 11 of the membrane separation unit 2 down to 0.4 bar to maximum 1.4 bar, where that of less than 1 bar is of advantage. At the same time, the pressure on the retentate side 12 of the membrane separation unit should be 1 to 2.5 bar, in particular 1 bar.

The membrane separation unit 2 may comprise membrane separation devices 10 which may differ structurally. One can use plate modules, pocket modules or/and hollow fiber modules as membrane separation devices 10. There are also potentialities to utilize other constructions of the membrane separation devices. The membrane separation devices can be used concurrently to produce streams of different volumes. However, it is vitally important that the membrane separation device 10 must include at least one membrane, which would enable the penetration of the selected gas components into the permeate 9.

A considerable advantage of this method is that it is carried out on one level and is, therefore, easy to use. The division of the air stream 7, supplied to the membrane separation unit, is based on the principle of gas permeation. The driving force of this division is the difference of pressure between the air 7 and the permeate 9. It is possible to manage the level of gas enrichment with any of its components by means of modifying the volume of the streams of gases, e.g., of the air 7, of the retentate 8 and of the permeate 9 as well as by pressure level control in every particular case. The pressure on the permeate side 11 of the membrane separation unit 2 adjusted between 0.4 and 1.4 bar with under-pressure indexes being preferred, has a positive impact on the process of division. In this way, it is possible to regulate the volume stream and the oxygen content of the permeate 9.

The invention determines that the difference of pressure between the air 7 supplied into the membrane separation unit 2, and the oxygen-depleted retentate 8 should not exceed 0.8 bar. The difference can be regulated to save power and to produce the permeate 9 with the needed oxygen concentration.

However, not shown in the figures is that the pressure compressor 4 may be adjusted on the retentate side 12 of the membrane in a way that the retentate 8 will be absorbed. In this case, the air 7 must not be compressed before entering the membrane separation unit 2. In this case, the driving force of the division as well as enrichment of the permeate 9 with oxygen are defined by the difference of pressure between the retentate 8 and the permeate 9.

In order to enable an easy transportation of the separation device, it is further asserted that all its components, including the membrane separation unit 2, vacuum compressor 3, pressure compressor 4 as well as the other elements, which belong to the membrane separation system, should be mobile. It is especially important as the separation plant has a compact structure and consequently is small in size and offers component control units easy to control.

An embodiment of the oxygen enrichment of the air 7 presupposes that the air 7 is fed to the membrane separation unit 2 in a stream having a volume of 7.6 m$^3$/h under the absolute pressure of 1.3 bar. In the membrane separation unit 2, the air stream 7 is separated into an oxygen-enriched volume stream, the permeate 9, and an oxygen-depleted stream, the retentate 8. The pressure on the permeate side is eased with the help of the vacuum compressor 3 drawing the down to 200 mbar. The result is a stream with a flow rate of 3.1 m$^3$/h under the absolute pressure of 0.8 bar with the oxygen content of 25.46%. On the retentate side 12, the pressure reaches an absolute level of 1.15 bar. The stream of retentate 8 with oxygen content of 18.75% constitutes a flow of 4.5 m$^3$/h.

FIG. 2 shows a scheme of the qualitative change of the content of oxygen (curve b) $Y_{O2}$ [%], depending on the decrease of pressure on the permeate side of the membrane separation unit.

In the course of developing the invention, it was found out that the optimum for the oxygen enriched volume stream on the permeate side occurs depending on the pressure level of the feed stream and the retentate. It leads to the increase of oxygen concentration on the permeate side. If the difference of pressure between the feed stream and the retentate stream is too small, the obtained oxygen concentration decreases.

Moreover, in the course of the invention, it was discovered that the reduction of pressure on the permeate side compared to the inlet pressure of the feed stream results in a better and higher concentration of the enriched component in the permeate stream. The stream $V_p$ [m$^3$/h] of the permeate shows a degressive rising curve with the reduction of pressure level on the permeate side (curve a). On the contrary, the energy consumption $P_{el}$ [kW] needed to ease the pressure level on the permeate side, which is shown on the FIG. 2 by the curve c, rises progressively with the growing pressure ease of the permeate stream.

In addition, it is pointed out that recycling of the permeate 9 and/or the retentate 8 is basically possible, although it is not presently contemplated. Furthermore, the inverse coupling of the permeate 9 with the retentate 8 is also basically possible, although not presently contemplated. This is mostly applied when the implementation of the invented method for the oxygen enrichment is concerned.

What is claimed is:

1. A membrane separation process for the enrichment of oxygen in an air flow using a membrane separation system with a membrane separation unit having at least one membrane for separation of the air flow into a retentate, which is discharged on a retentate side of the at least one membrane, and a permeate, which is discharged on a permeate side of the at least one membrane, comprising the steps of:

drawing the air flow into the membrane separation system directly from the atmosphere, compressing the air flow and then delivering the compressed air flow to the membrane separation unit at an absolute pressure of 1.35 to 1.5 bar, permeating oxygen through the at least one membrane using a solubility-diffusion mechanism so as to enrich the oxygen concentration of the permeate by 22 to 45 volume percent, and lowering the pressure on the permeate side of the at least one membrane and discharging the permeate from the membrane separation unit at an absolute pressure of 0.4 to 0.85 bar.

2. The membrane separation process according to claim 1, wherein at least one of a volume of the permeate stream and a concentration of the component of the air flow that is enriched is controlled by lowering the pressure level on the permeate side.

3. The membrane separation process according to claim 1, wherein the process is performed in a single-stage.

4. The membrane separation process according to claim 1, wherein a pressure difference between the air flow and the retentate does not exceed 1 bar.

5. The membrane separation process according to claim 1, wherein the permeate which is enriched is oxygen, the oxygen being enriched to a concentration of 22 to 45 Vol.%.

6. The membrane separation process according to claim 1, wherein the membrane separation device used comprises at least one of a pocket module, a plate module and a hollow fiber module.

7. The membrane separation process according to claim 1, wherein the air flow is divided in at least two streams and split through at least one of a plurality of different parallel membrane separation devices and membrane separation units installed in a membrane separation system.

8. The membrane separation process according to claim 1, wherein, before entering the membrane separation unit, the air flow is cleaned of at least one of particles, oils and fat.

9. The membrane separation process according to claim 1, wherein, before entering the membrane separation unit, the temperature of the air flow is changed by about 10° C. to 25° C.

10. The membrane separation process according to claim 1, wherein, before entering the membrane separation unit, the air flow is freed of condensable parts.

11. The membrane separation process according to claim 1, wherein the separation of the air flow in the membrane separation unit is performed at ambient temperature.

12. The membrane separation process according to claim 1, wherein the pressure of at least one of the inlet pressure of the air flow and the outlet pressure of the retentate and the outlet pressure of the permeate is changed in a single-stage.

13. A membrane separation process for the enrichment of oxygen in an air flow using a membrane separation system with a membrane separation unit having at least one membrane for separation of the air flow into a retentate, which is discharged on a retentate side of the at least one membrane, and a permeate, which is discharged on a permeate side of the at least one membrane, comprising the steps of:

drawing the air flow into the membrane separation system directly from the atmosphere, compressing the air flow and then delivering the compressed air flow to the membrane separation unit at an absolute pressure of 1.35 to 1.5 bar, permeating oxygen through the at least one membrane using a solubility-diffusion mechanism so as to enrich the oxygen concentration of the permeate by 22 to 45 volume percent, and lowering the pressure on the permeate side of the at least one membrane and discharging the permeate from the membrane separation unit at an absolute pressure of 0.4 to 0.65 bar.

14. The membrane separation process according to claim 13, wherein the pressure difference between the air flow and the retentate does not exceed 1 bar.

15. The membrane separation process according to claim 13, wherein at least one of a volume of the permeate stream and the oxygen concentration of the air flow that is enriched is controlled by lowering the pressure level on the permeate side.

16. The membrane separation process according to claim 13, wherein the oxygen is enriched to a concentration of 30 Vol.%.

17. The membrane separation process according to claim 13, wherein the process is performed in a single-stage.

18. The membrane separation process according to claim 13, wherein the air flow is divided in at least two streams and split through at least one of a plurality of different parallel membrane separation devices and membrane separating units installed in a membrane separation system.

19. The membrane separation process according to claim 13, wherein the membrane separation device used comprises at least one of a pocket module and/or plate module and/or hollow fiber module.

20. The membrane separation process according to claim 13, wherein before entering the membrane separation unit, the air flow is cleaned of at least one of particles, oils and fat.

21. The membrane separation process according to claim 13, wherein before entering the membrane separation unit, the temperature of the air flow changed by about 10° C. to 25° C.

22. The membrane separation process according to claim 13, wherein before entering the membrane separation unit, the air flow is freed of condensable parts.

23. The membrane separation process according to claim 13, wherein the separation of the air flow in the membrane separation unit is performed at ambient temperature.

24. The membrane separation process according to claim 13, wherein the pressure of at least one of the inlet pressure of the air flow and the outlet pressure of the retentate and the outlet pressure of the permeate is changed in a single-stage.

* * * * *